US011338795B2

(12) United States Patent
Komuro et al.

(10) Patent No.: US 11,338,795 B2
(45) Date of Patent: May 24, 2022

(54) VEHICLE CONTROL APPARATUS

(71) Applicant: SUBARU CORPORATION, Tokyo (JP)

(72) Inventors: Masaki Komuro, Tokyo (JP); Junya Ogasahara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 360 days.

(21) Appl. No.: 16/209,602

(22) Filed: Dec. 4, 2018

(65) Prior Publication Data
US 2019/0193720 A1    Jun. 27, 2019

(30) Foreign Application Priority Data

Dec. 27, 2017 (JP) .............................. JP2017-250394

(51) Int. Cl.
B60W 20/40 (2016.01)
B60L 15/20 (2006.01)
(Continued)

(52) U.S. Cl.
CPC ......... B60W 20/40 (2013.01); B60L 15/2054 (2013.01); B60W 10/06 (2013.01);
(Continued)

(58) Field of Classification Search
CPC ...... B60W 20/40; B60W 10/08; B60W 10/06; B60W 2510/0638; B60W 2710/024;
(Continued)

(56) References Cited

U.S. PATENT DOCUMENTS 9,592,823 B2 * 3/2017 Nakanishi ............. B60W 10/02
2006/0089232 A1 * 4/2006 Kobayashi ............... B60K 6/48
477/70
2007/0227791 A1 * 10/2007 Ueno .................... B60W 10/02
180/65.245

(Continued)

FOREIGN PATENT DOCUMENTS

JP    2011-046282 A      3/2011
JP    2011046282 A  *   3/2011
(Continued)

OTHER PUBLICATIONS

Kazunari et al, "Vehicle Drive Controller", Japanese Patent Publication JP2011-046282A, Mar. 10, 2011, English Translation from Espacenet (Year: 2011).*

(Continued)

Primary Examiner — Nadeem Odeh
(74) Attorney, Agent, or Firm — McDermott Will & Emery LLP

(57) ABSTRACT

A vehicle control apparatus includes: a clutch controller configured to switch an operation state of a clutch mechanism from a release state to an engagement state upon switching of a traveling mode from a motor traveling mode to an engine traveling mode; and a motor controller configured to control a traveling motor to suppress variation in torque upon starting of the engine. The clutch controller is configured to control the clutch mechanism to be brought into the engagement state at a first engaging speed when the engine is started on a condition that a revolution speed of the motor driving system is higher than a revolution threshold, and to control the clutch mechanism to be brought into the engagement state at a second engaging speed lower than the first engaging speed when the engine is started on a condition that the revolution speed is lower than the revolution threshold.

5 Claims, 8 Drawing Sheets

(51) Int. Cl.
*B60W 10/08* (2006.01)
*B60W 10/06* (2006.01)

(52) U.S. Cl.
CPC ........ *B60W 10/08* (2013.01); *B60L 2240/423* (2013.01); *B60W 2510/0638* (2013.01); *B60W 2710/024* (2013.01)

(58) Field of Classification Search
CPC .......... B60W 2710/023; B60L 15/2054; B60L 2240/423; B60K 2006/4825
See application file for complete search history.

(56) References Cited

U.S. PATENT DOCUMENTS

| | | | | |
|---|---|---|---|---|
| 2009/0156355 A1* | 6/2009 | Oh | ........................ | B60W 10/08 477/5 |
| 2011/0245034 A1* | 10/2011 | Yoshida | ................... | B60K 6/48 477/8 |
| 2012/0290158 A1* | 11/2012 | Yoshikawa | ........... | B60W 20/40 701/22 |
| 2013/0085634 A1* | 4/2013 | Jinbo | ..................... | B60K 6/543 701/22 |
| 2013/0211654 A1* | 8/2013 | Tanisshima | ............. | B60L 58/25 701/22 |
| 2014/0136039 A1* | 5/2014 | Tanishima | .......... | B60L 15/2054 701/22 |
| 2016/0082941 A1* | 3/2016 | Oshiumi | ................ | B60K 6/387 180/65.265 |
| 2017/0197607 A1* | 7/2017 | Yamazaki | ............. | B60W 10/02 |

FOREIGN PATENT DOCUMENTS

| | | |
|---|---|---|
| JP | 2012-202501 A | 10/2012 |
| JP | 2013-075591 A | 4/2013 |
| JP | 2016-098872 A | 5/2016 |

OTHER PUBLICATIONS

Japanese Notice of Reasons for Refusal issued in corresponding Japanese Patent Application No. 2017-250394, dated Jul. 23, 2019, with English translation.

* cited by examiner

VEHICLE CONTROL APPARATUS

CROSS-REFERENCE TO RELATED APPLICATIONS

The present application claims priority from Japanese Patent Application No. 2017-250394 filed on Dec. 27, 2017, the entire contents of which are hereby incorporated by reference.

BACKGROUND

The technology relates to a vehicle control apparatus including an engine and a motor.

A hybrid electric vehicle has traveling modes such as an engine traveling mode that allows for traveling based on an engine and a motor traveling mode that allows for traveling based on a traveling motor, for example, as disclosed in Japanese Unexamined Patent Application Publication No. 2016-98872. When the traveling mode is switched from the motor traveling mode to the engine traveling mode, typically, an engine is started and a clutch mechanism is brought into an engagement state to thereby transmit engine force to wheels.

SUMMARY

An aspect of the technology provides a vehicle control apparatus that includes a motor driving system, a clutch mechanism, a clutch controller, an engine controller, and a motor controller. The motor driving system includes a traveling motor and a wheel coupled to the traveling motor. The clutch mechanism is provided between an engine and the motor driving system and has an operation state that is switchable between an engagement state and a release state. The clutch controller is configured to switch the operation state of the clutch mechanism from the release state to the engagement state upon switching of a traveling mode from a motor traveling mode to an engine traveling mode. The motor traveling mode allows for traveling based on the traveling motor. The engine traveling mode allows for traveling based on the engine. The engine controller is configured to start the engine upon the switching of the traveling mode from the motor traveling mode to the engine traveling mode. The motor controller is configured to control the traveling motor to suppress variation in torque at time of the starting of the engine, upon the switching of the traveling mode from the motor traveling mode to the engine traveling mode. The clutch controller is configured to control the clutch mechanism to be brought into the engagement state at a first engaging speed when the engine is started on a condition that a revolution speed of the motor driving system is higher than a revolution threshold, and configured to control the clutch mechanism to be brought into the engagement state at a second engaging speed when the engine is started on a condition that the revolution speed of the motor driving system is lower than the revolution threshold. The second engaging speed is lower than the first engaging speed.

An aspect of the technology provides a vehicle control apparatus including a motor driving system, a clutch mechanism, and circuitry. The motor driving system includes a traveling motor and a wheel coupled to the traveling motor. The clutch mechanism is provided between an engine and the motor driving system and has an operation state that is switchable between an engagement state and a release state. The circuitry is configured to switch the operation state of the clutch mechanism from the release state to the engagement state upon switching of a traveling mode from a motor traveling mode to an engine traveling mode. The motor traveling mode allows for traveling based on the traveling motor. The engine traveling mode allows for traveling based on the engine. The circuitry is configured to start the engine upon the switching of the traveling mode from the motor traveling mode to the engine traveling mode. The circuitry is configured to control the traveling motor to suppress variation in torque at time of the starting of the engine, upon the switching of the traveling mode from the motor traveling mode to the engine traveling mode. The circuitry is configured to control the clutch mechanism to be brought into the engagement state at a first engaging speed when the engine is started on a condition that a revolution speed of the motor driving system is higher than a revolution threshold. The circuitry is configured to control the clutch mechanism to be brought into the engagement state at a second engaging speed when the engine is started on a condition that the revolution speed of the motor driving system is lower than the revolution threshold. The second engaging speed is lower than the first engaging speed.

DETAILED DESCRIPTION

Figure 1:
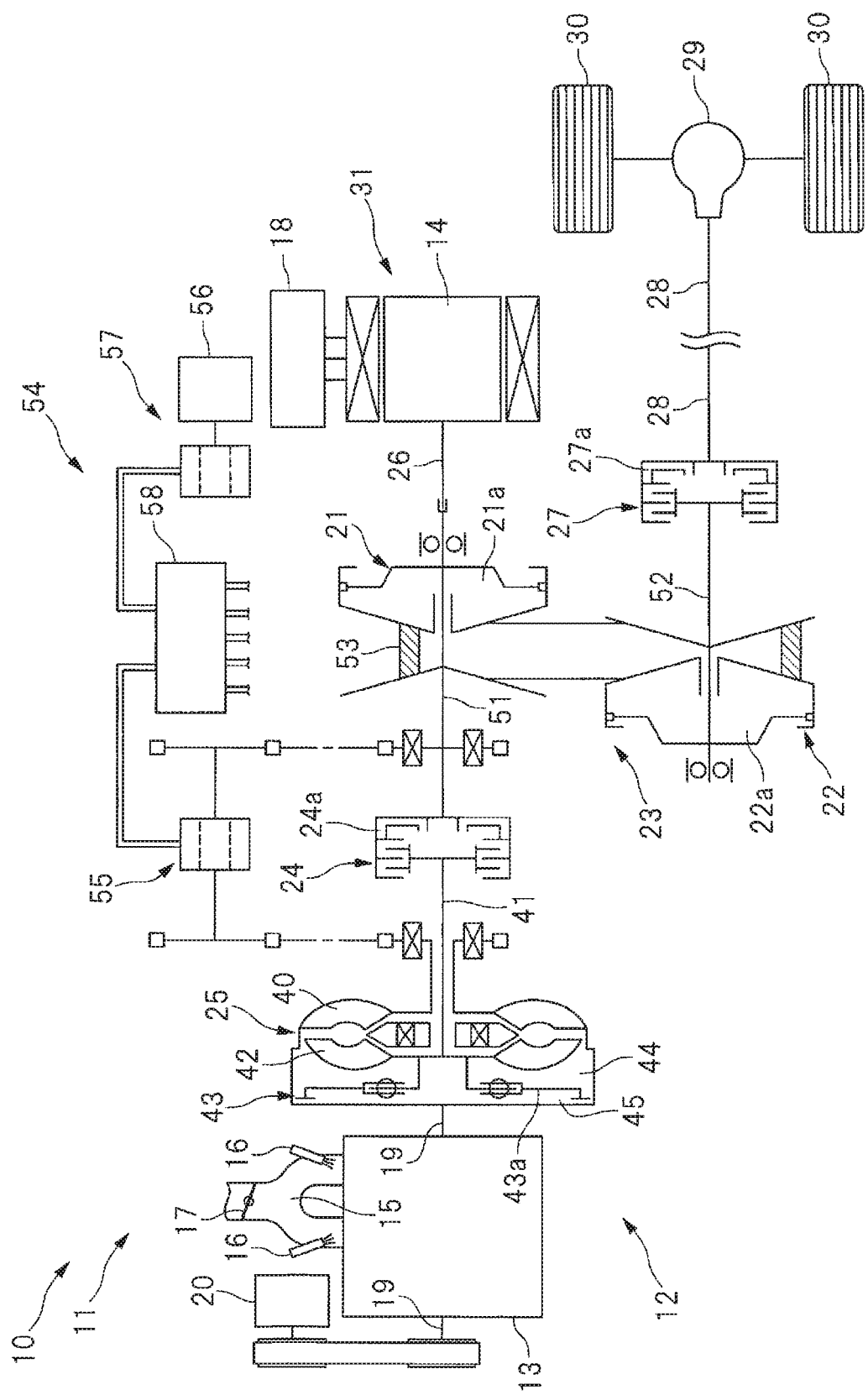
FIG. 1 is a diagram illustrating an outline of an example of a hybrid electric vehicle to which a vehicle control apparatus according to one implementation of the technology is applied.

In the following, some example implementations of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example implementations which are not recited in a most-generic independent claim of the disclosure are optional and may be provided on an as-needed basis. Throughout the present specification and the drawings, elements having substantially the same function and configuration are denoted with the same numerals to avoid any redundant description.

When a traveling mode is switched from a motor traveling mode to an engine traveling mode, starting of an engine and engaging of a clutch are often performed at almost the same timing in order to swiftly perform the switching of the traveling mode. When the starting of the engine and the engaging of the clutch are thus performed at almost the same timing, variation in torque upon the starting of the engine is transmitted to a driving system. This may possibly generate vibrations in the driving system, which may possibly give an occupant of a vehicle a feeling of strangeness. It may be considered to generate regenerative torque in the traveling motor and cancel engine torque with the generated regenerative torque, to thereby suppress generation of vibrations upon the starting of the engine. It has been difficult, however, to suppress the vibrations when the traveling mode is switched due to increasing variation in torque upon the engaging of the clutch in some revolution situations of the driving system.

It is desirable to suppress vibrations upon switching of a traveling mode from a motor traveling mode to an engine traveling mode.

[Power Unit]

FIG. 1 illustrates an outline of a hybrid electric vehicle 11 to which a vehicle control apparatus 10 according to an example implementation of the technology is applied. Referring to FIG. 1, a power unit 12 mounted on the hybrid electric vehicle 11 may include an engine 13 and a motor generator 14 both as power sources. In one implementation, the motor generator 14 may serve as a "traveling motor". An intake manifold 15 of the engine 13 may include a plurality of injectors 16 that each sprays fuel and a throttle valve 17 that adjusts an intake amount. The motor generator 14 may be coupled to an inverter 18 which serves as an electric power converter. A crankshaft 19 of the engine 13 may be coupled to a starter generator 20 that serves as both a generator and a motor.

The power unit 12 may include a continuously-variable transmission (CVT) 23. The CVT 23 may include a primary pulley 21 and a secondary pulley 22. One end of the primary pulley 21 may be coupled to the engine 13 via an input clutch 24 and a torque converter 25. The other end of the primary pulley 21 may be coupled to the motor generator 14 via a rotor shaft 26. The secondary pulley 22 may be coupled to a wheel output shaft 28 via an output clutch 27. The wheel output shaft 28 may be coupled to wheels 30 via a differential mechanism 29. As described above, the power unit 12 included as part of the vehicle control apparatus 10 may be provided with a motor driving system 31 that includes components such as the motor generator 14, the CVT 23, or the wheels 30. In other words, the power unit 12 may be provided with the motor driving system 31 that includes the motor generator 14 and the wheels 30 coupled to the motor generator 14.

The input clutch 24 may be provided between the torque converter 25 and the primary pulley 21, i.e., between the engine 13 and the motor driving system 31. In one implementation, the input clutch 24 may serve as a "clutch mechanism". The input clutch 24 may be, for example, a friction clutch including an engagement oil chamber 24a. The input clutch 24 may be so controlled as to be in an engagement state by a hydraulic system 54 supplying hydraulic oil to the engagement oil chamber 24a. In contrast, the input clutch 24 may be so controlled as to be in a release state by the hydraulic system 54 discharging the hydraulic oil from the engagement oil chamber 24a. The hydraulic system 54 will be described later in greater detail. The controlling the input clutch 24 to be brought into the engagement state may couple the engine 13 and the CVT 23 to each other, and the controlling the input clutch 24 to be brought into the release state may decouple the engine 13 and the CVT 23 from each other.

The torque converter 25 serving as a fluid coupling may be provided between the engine 13 and the input clutch 24. The torque converter 25 may include a pump impeller 40 and a turbine runner 42. The pump impeller 40 may be coupled to the crankshaft 19. The turbine runner 42 may face the pump impeller 40 and be coupled to the turbine shaft 41. The torque converter 25 may include a lock-up clutch 43 built therein. The lock-up clutch 43 may include a clutch plate 43a. A sectioned apply chamber 44 may be provided near one surface of the clutch plate 43a, and a sectioned release chamber 45 may be provided near the other surface of the clutch plate 43a. The lock-up clutch 43 may be so controlled as to be brought into an engagement state by the later-described hydraulic system 54 supplying the hydraulic oil to the apply chamber 44 and discharging the hydraulic oil from the release chamber 45. In contrast, the lock-up clutch 43 may be so controlled as to be brought into a release state by the hydraulic system 54 supplying the hydraulic oil to the release chamber 45 and discharging the hydraulic oil from the apply chamber 44.

The CVT 23 may include the primary pulley 21 provided on a primary shaft 51 and the secondary pulley 22 provided on a secondary shaft 52. A sectioned primary oil chamber 21a may be provided in the primary pulley 21, and a sectioned secondary oil chamber 22a may be provided in the secondary pulley 22. Further, a drive chain 53 may be wound around the primary pulley 21 and the secondary pulley 22. The later-described hydraulic system 54 may adjust hydraulic pressures in the primary oil chamber 21a and the secondary oil chamber 22a to thereby vary a size in which the drive chain 53 is wound. This allows for continuous variation in power transmitted from the primary shaft 51 to the secondary shaft 52.

The output clutch 27 may be provided between the secondary pulley 22 and the wheels 30. The output clutch 27 may include an engagement oil chamber 27a. The output clutch 27 may be so controlled as to be brought into an engagement state by the later-described hydraulic system 54 supplying the hydraulic oil to the engagement oil chamber 27a. In contrast, the output clutch 27 may be so controlled as to be brought into a release state by the hydraulic system 54 discharging the hydraulic oil from the engagement oil chamber 27a. The controlling the output clutch 27 to be brought into the engagement state may couple the CVT 23 and the wheels 30 to each other, and the controlling the output clutch 27 to be brought into the release state may decouple the CVT 23 and the wheels 30 from each other.

The power unit 12 may include the hydraulic system 54 including a component such as an oil pump, allowing for controlling of supply of the hydraulic oil to components such as the CVT 23, the torque converter 25, the input clutch 24, or the output clutch 27. The hydraulic system 54 may include a mechanical oil pump 55 and an electric oil pump 57. The mechanical oil pump 55 may be driven by means of components such as the engine 13 or the primary shaft 51. The electric oil pump 57 may be driven by an electric motor 56. The hydraulic system 54 may also include a valve unit 58, allowing for controlling matters such as where to supply the hydraulic oil or a pressure of the hydraulic oil. The valve unit 58 may include components such as a solenoid valve or an oil passage. The electric oil pump 57 may be driven in a situation where a discharge pressure of the mechanical oil pump 55 is decreased, i.e., in a situation where the hybrid electric vehicle 11 travels at a lower vehicle speed in a motor traveling mode which will be described later in greater detail.

[Control System]

Figure 2:
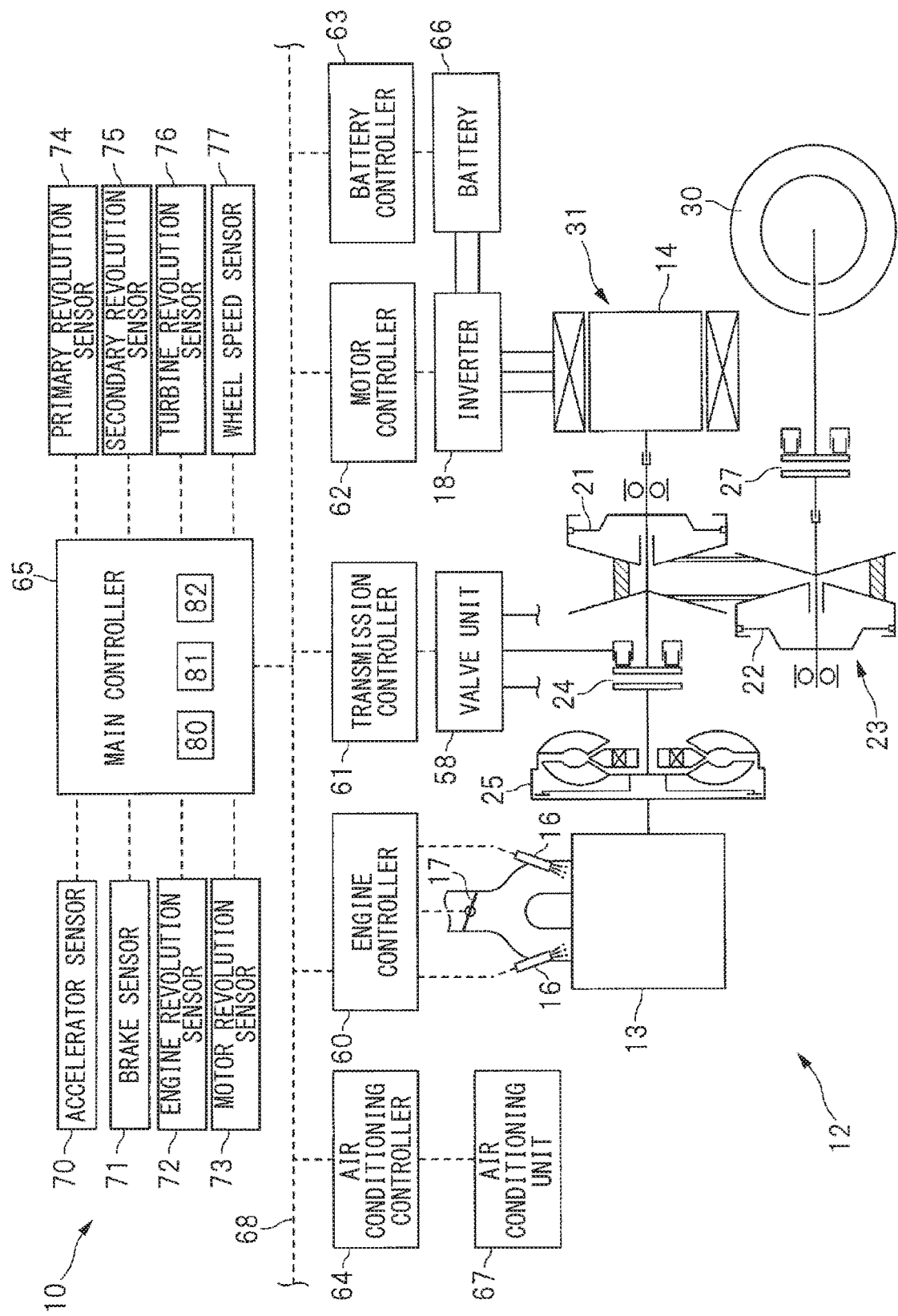
FIG. 2 is a diagram illustrating an outline of an example of a control system of the vehicle control apparatus.

FIG. 2 illustrates an outline of an example of a control system of the vehicle control apparatus 10. Referring to FIG. 2, the vehicle control apparatus 10 may include various controllers, allowing for controlling of an operating state of a unit such as the power unit 12. The various controllers may include, for example but not limited to, a controller including a microcomputer. For example, the vehicle control apparatus 10 may include an engine controller 60, a transmission controller 61, a motor controller 62, a battery controller 63, an air conditioning controller 64, and a main controller 65. The engine controller 60 may control the engine 13. The transmission controller 61 may control devices including the input clutch 24 and the CVT 23. The motor controller 62 may control the motor generator 14. The battery controller 63 may control charge and discharge of a battery 66. The air conditioning controller 64 may control an air conditioning unit 67 including an air conditioner, etc. The main controller 65 may generally control the respective controllers including the engine controller 60, the transmission controller 61, the motor controller 62, the battery controller 63, and the air conditioning controller 64. The engine controller 60, the transmission controller 61, the motor controller 62, the battery controller 63, and the air conditioning controller 64 may be so coupled to one another as to be able to perform communication mutually and freely via an in-vehicle network 68. Non-limiting examples of the in-vehicle network 68 may include a controller area network (CAN) and a local interconnect network (LIN).

The main controller 65 may supply a control signal to each of the controllers, i.e., to each of the engine controller 60, the transmission controller 61, the motor controller 62, the battery controller 63, and the air conditioning controller 64 and thereby control the devices including the engine 13, the motor generator 14, and the CVT 23 in association. The main controller 65 may be coupled to a plurality of sensors including, for example but not limited to, an accelerator sensor 70, a brake sensor 71, an engine revolution sensor 72, a motor revolution sensor 73, a primary revolution sensor 74, a secondary revolution sensor 75, a turbine revolution sensor 76, and a wheel speed sensor 77. The accelerator sensor 70 may detect an operation situation of an accelerator pedal. The brake sensor 71 may detect an operation situation of a brake pedal. The engine revolution sensor 72 may detect a revolution speed of the engine 13. The motor revolution sensor 73 may detect a revolution speed of the motor generator 14. The primary revolution sensor 74 may detect a revolution speed of the primary shaft 51. The secondary revolution sensor 75 may detect a revolution speed of the secondary shaft 52. The turbine revolution sensor 76 may detect a revolution speed of the turbine shaft 41. The wheel speed sensor 77 may detect a wheel speed that is a revolution speed of any of the wheels 30.

The main controller 65 may set a control target for each of the devices including the engine 13 and the motor generator 14 on the basis of information supplied from the various sensors, the various controllers, or any other related device. Further, the main controller 65 may supply a control signal based on the set control target to each of the controllers including the engine controller 60, the transmission controller 61, the motor controller 62, the battery controller 63, and the air conditioning controller 64. Each of the controllers including the engine controller 60, the transmission controller 61, the motor controller 62, the battery controller 63, and the air conditioning controller 64 that has received the control signal from the main controller 65 may control each of the devices including the engine 13 and the motor generator 14. For example, the engine controller 60 may supply a control signal to each device such as the injector 16 or the throttle valve 17 to thereby control factors such as engine torque or the number of engine revolutions. The transmission controller 61 may supply a control signal to the valve unit 58 that adjusts a pressure of the hydraulic oil to thereby control an operating state of the devices such as the CVT 23, the input clutch 24, the output clutch 27, or the torque converter 25. The motor controller 62 may supply a control signal to the inverter 18 that controls an electric current of the motor generator 14 to thereby control factors such as motor torque or the number of motor revolutions. In one implementation, the engine controller 60 may serve as an "engine controller". In one implementation, the transmission controller 61 may serve as a "clutch controller". In one implementation, the motor controller 62 may serve as a "motor controller".

[Traveling Mode]

The hybrid electric vehicle 11 may have two traveling modes, i.e., an engine traveling mode and a motor traveling mode. The engine traveling mode may allow for traveling based on the engine 13. The motor traveling mode may allow for traveling based on the motor generator 14. The main controller 65 may include various operation units such as an engine traveling mode controller 80, a motor traveling mode controller 81, or a traveling mode switching unit 82 that are directed to execution of the engine traveling mode and the motor traveling mode.

When the engine traveling mode is executed, the engine traveling mode controller 80 may supply a control signal to each of the controllers including the engine controller 60, the transmission controller 61, the motor controller 62, and the battery controller 63 to thereby control each of the operating devices, of the power unit 12, including the engine 13. When the motor traveling mode is executed, the motor traveling mode controller 81 may supply a control signal to each of the controllers including the engine controller 60, the transmission controller 61, the motor controller 62, and the battery controller 63 to thereby control each of the operating devices, of the power unit 12, including the motor generator 14. The traveling mode switching unit 82 may select which one to execute from the engine traveling mode and the motor traveling mode and switch the traveling mode to the selected mode. The traveling mode switching unit 82 may perform the selection and switching of the traveling mode described above on the basis of information such as a vehicle traveling situation or a driving operation situation.

The engine traveling mode may be selected as the traveling mode, for example but not limited to, in a case where requested drive force increases as a result of pressing down of the accelerator pedal or in a case where the hybrid electric vehicle 11 travels in a higher vehicle speed range. In contrast, the motor traveling mode may be selected as the traveling mode, for example but not limited to, in a case where the requested drive force decreases as a result of stopping of the pressing down of the accelerator pedal or in a case where the hybrid electric vehicle 11 travels in a lower vehicle speed range. The engine traveling mode may be also selected in a case where the air conditioning unit 67 is brought into operation, which involves driving of a compressor of the air conditioning unit 67 by the engine 13.

Further, for example but not limited to, in a case where a level of a state of charge (SOC) of the battery 66 is lower than a predetermined threshold, or in a case where a temperature of the battery 66 is higher than a predetermined threshold, the engine traveling mode may be also selected as the traveling mode in view of suppression or stopping of charge or discharge of the battery 66.

Figure 3A:
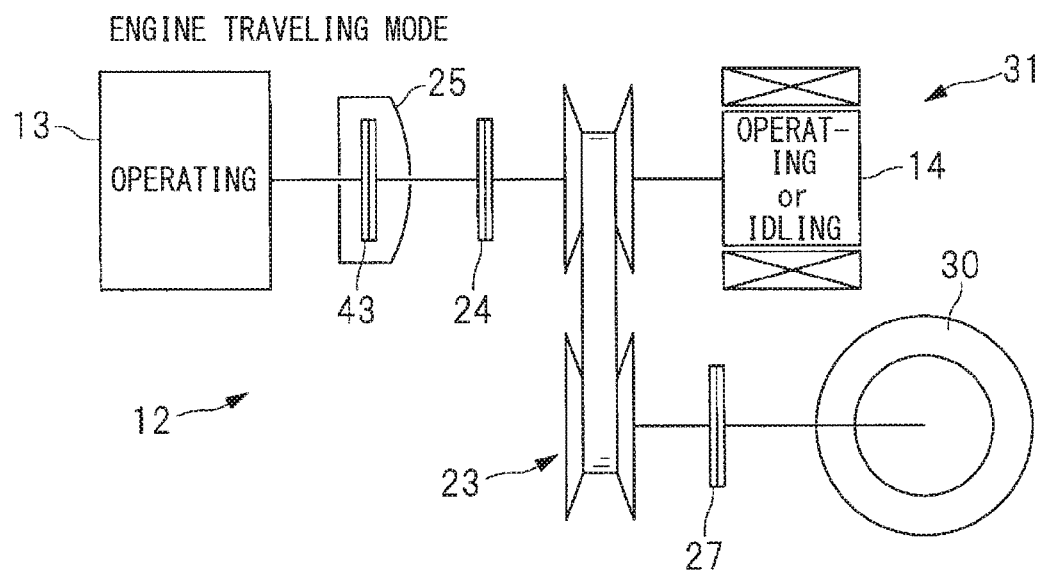
FIG. 3A is a diagram illustrating an outline of an example of an operating situation of a power unit in an engine traveling mode.
Figure 3B:
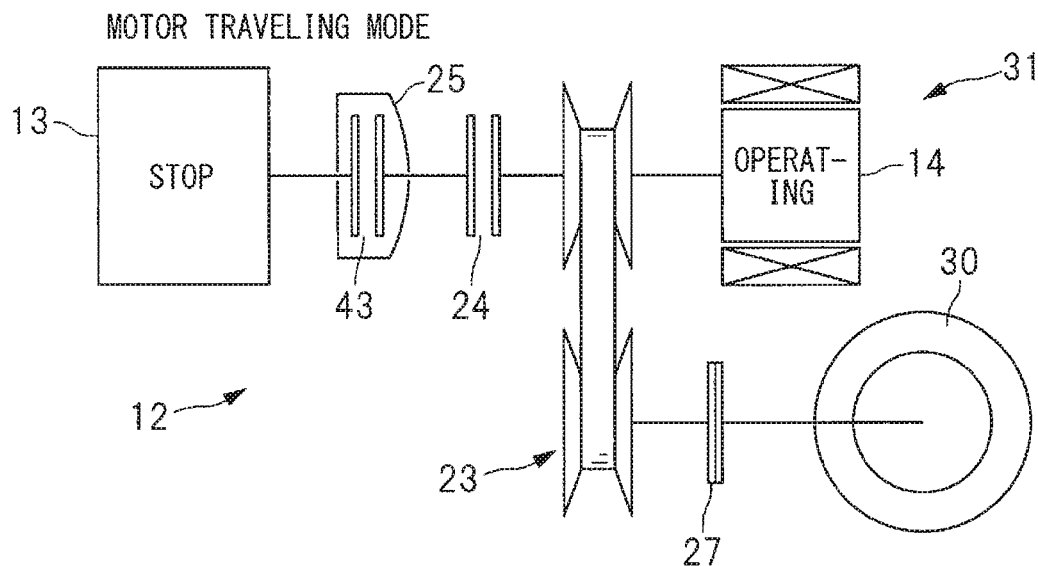
FIG. 3B is a diagram illustrating an outline of an example of an operating situation of the power unit in a motor traveling mode.

FIG. 3A illustrates an outline of an example of an operating situation of the power unit 12 in the engine traveling mode. FIG. 3B illustrates an outline of an example of the operating situation of the power unit 12 in the motor traveling mode. As illustrated in FIG. 3A, in the engine traveling mode, the input clutch 24 may be controlled to be brought into an engagement state, the output clutch 27 may be controlled to be in an engagement state, and the engine 13 may be controlled to be in an operating state, i.e., a driving state. This allows for driving of the wheels 30 by means of engine power in the engine traveling mode. It is to be noted that, in one example where the engine traveling mode is executed, the motor generator 14 may be controlled to be, for example but not limited to, in a power running state or a regeneration state. In another example where the engine traveling mode is executed, the motor generator 14 may be controlled to be, for example but not limited to, in an idling state.

As illustrated in FIG. 3B, in the motor traveling mode, the input clutch 24 may be controlled to be in a release state, the output clutch 27 may be controlled to be in the engagement state, the engine 13 may be controlled to be in a stopped state, and the motor generator 14 may be controlled to be in an operating state. This allows for driving of the wheels 30 by means of motor power while maintaining the stopped state of the engine 13 in the motor traveling mode. It is to be noted that the term "operating state" of the motor generator 14 may include the power running state and the regenerative state of the motor generator 14. The term "power running state" of the motor generator 14 refers to a state in which a power running torque for acceleration is generated in the motor generator 14, and the term "regenerative state" of the motor generator 14 refers to a state in which a regenerative torque for deceleration is generated in the motor generator 14.

[Traveling Mode Switching Control (Outline)]

A description will be given next of a traveling mode switching control that switches the traveling mode. As illustrated in FIGS. 3A and 3B, switching of the traveling mode from the motor traveling mode to the engine traveling mode may possibly require starting of the engine 13 and switching of the operation state of the input clutch 24 to the engagement state. When the traveling mode is switched from the motor traveling mode to the engine traveling mode, a control directed to the starting of the engine 13 and a control directed to engaging of the input clutch 24 may be executed at almost the same timing in view of swift switching of the traveling mode. On this occasion, the engine torque that rises upon the starting of the engine 13 may be transmitted from the input clutch 24 to the motor driving system 31 including devices such as the CVT 23. This variation in torque may generate vibrations, which may give an occupant of the hybrid electric vehicle 11 a feeling of strangeness. To address this, the vehicle control apparatus 10 may suppress, by means of the motor torque, the variation in torque upon the starting of the engine 13, by executing a torque control of the motor generator 14 upon the starting of the engine 13.

Regarding the hybrid electric vehicle 11, the following three example switching patterns may be assumable for switching of the traveling mode from the motor traveling mode to the engine traveling mode. In a first pattern, the input clutch 24 may be brought into the engagement state while starting the engine 13 during the traveling of the hybrid electric vehicle 11 in the motor traveling mode. Further, in the first pattern, the traveling mode may be switched to the engine traveling mode while the traveling state of the hybrid electric vehicle 11 is maintained. It is assumed that the first switching pattern may be executed, for example but not limited to, in a situation where the accelerator pedal is pressed down while the hybrid electric vehicle 11 is traveling in the motor traveling mode and the traveling mode is switched to the engine traveling mode.

In a second pattern, the input clutch 24 may be brought into the engagement state immediately before the hybrid electric vehicle 11 that has been traveling in the motor traveling mode is stopped. Further, in the second pattern, after the stopping of the hybrid electric vehicle 11, the engine 13 may be started to switch the traveling mode to the engine traveling mode. It is assumed that the second switching pattern may be executed, for example but not limited to, in a situation where the hybrid electric vehicle 11 traveling in the motor traveling mode stops as a result of pressing down of the brake pedal, and a device such as the air conditioning unit 67 is brought into the operating state after the stopping of the hybrid electric vehicle 11, which causes the traveling mode to be switched to the engine traveling mode. It is to be noted that, when the hybrid electric vehicle 11 travels in the motor traveling mode at a vehicle speed lower than a predetermined vehicle speed, the input clutch 24 may be switched to the engagement state while the engine 13 is in the stop state, in view of swift switching of the traveling mode. The predetermined vehicle speed may be, for example but not limited to, 8 km/h. This allows for swift switching of the traveling mode to the engine traveling mode merely by starting the engine 13 in a case where the switching to the engine traveling mode is decided while the hybrid electric vehicle 11 is stopped or is traveling at a lower vehicle speed.

In a third pattern, the hybrid electric vehicle 11 traveling in the motor traveling mode is stopped without the input clutch 24 being brought into the engagement state. Further, in the third pattern, after the stopping of the hybrid electric vehicle 11, the input clutch 24 is brought into the engagement state while the engine 13 is started to cause the traveling mode to be switched to the engine traveling mode. It is assumed that the third switching pattern may be executed, for example but not limited to, in a situation where the brake pedal is pressed down of the hybrid electric vehicle 11 traveling in the motor traveling mode, for example, on a road surface covered with ice and therefore the wheels 30 are locked. In the situation where the wheels 30 of the hybrid electric vehicle 11 traveling in the motor traveling mode are locked, a line pressure of the hydraulic system 54 may be decreased sharply, which makes it more difficult to bring the input clutch 24 into the engagement state immediately before the hybrid electric vehicle 11 is stopped. For example, as described above, in a case where the traveling mode is switched to the engine traveling mode by bringing a device such as the air conditioning unit 67 into the operating state after the hybrid electric vehicle 11 is stopped while the input clutch 24 is in the release state, the traveling mode may be switched to the engine traveling mode in the third switching pattern.

[Traveling Mode Switching Control (Flowchart)]

Figure 4:
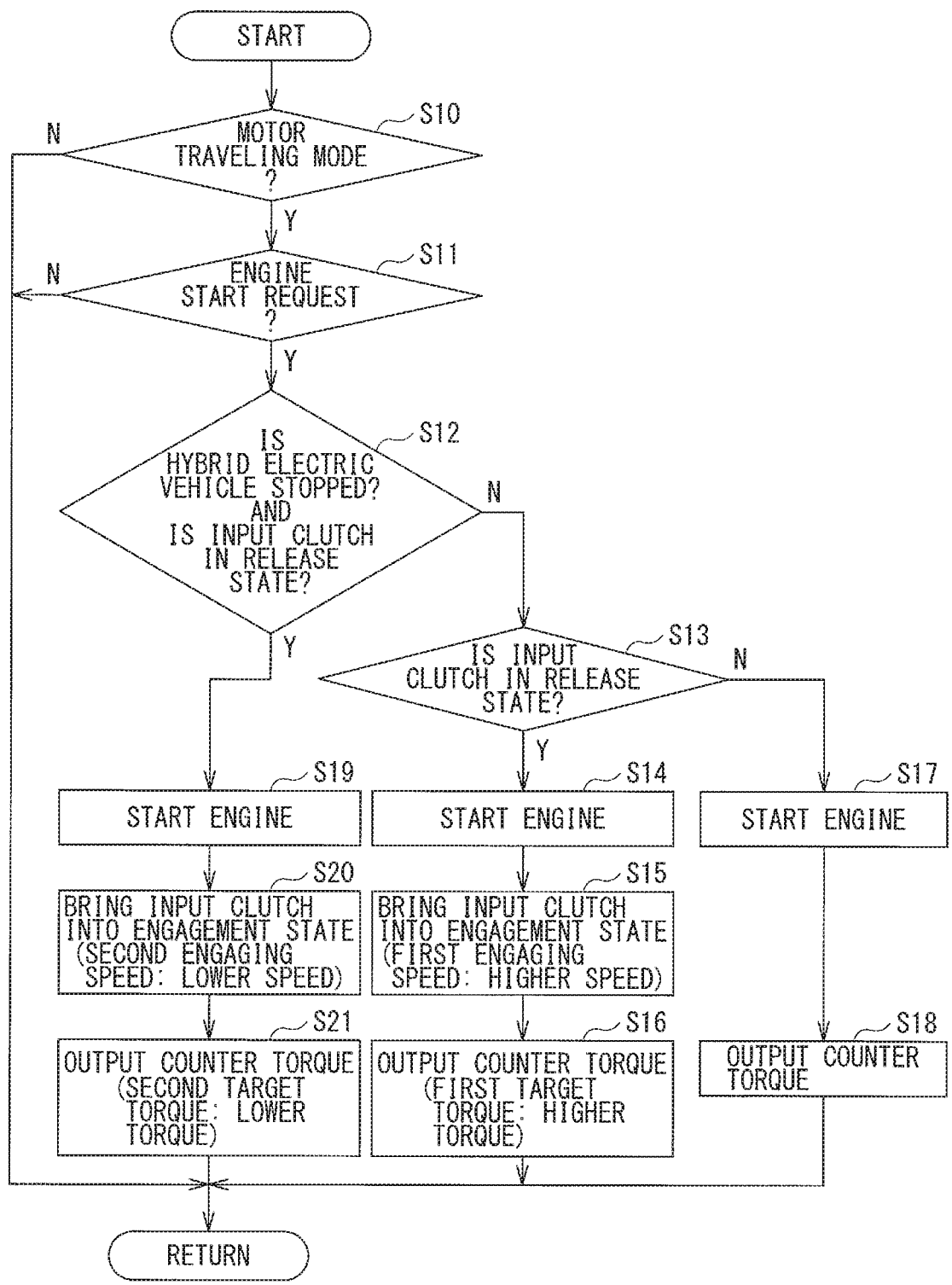
FIG. 4 is a flowchart illustrating an example of a procedure to execute a traveling mode switching control.

Referring to a flowchart, a description is given below of a control of starting the engine 13, a control of engaging of the input clutch 24, and a control of torque of the motor generator 14 that accompany the switching of the traveling mode from the motor traveling mode to the engine traveling mode. FIG. 4 is a flowchart illustrating an example of a procedure to execute the traveling mode switching control.

Referring to FIG. 4, in step S10, it may be determined whether the motor traveling mode is being executed. When the motor traveling mode is determined as being executed in step S10 ("Y" in step S10), the flow may proceed to step S11. In step S11, it may be determined whether an engine start request is being made. In other words, it may be determined whether a request for switching of the traveling mode to the engine traveling mode is being made in step S11. Non-limiting examples of a case where the engine start request is determined as being made may include: a case where the accelerator pedal is pressed down and the required acceleration becomes greater than a predetermined threshold; a case where the compressor of the air conditioning unit 67 is brought into the operating state; or a case where the SOC of the battery 66 is lower than a predetermined threshold.

When the engine start request is determined as being made in step S11 ("Y" in step S11), the flow may proceed to step S12. In step S12, it may be determined whether the hybrid electric vehicle 11 is stopped while the input clutch 24 is in the engagement state. When the hybrid electric vehicle 11 is determined as being traveling in step S12 ("N" in step S12) or when the input clutch 24 is determined as being in the engagement state in step S12 ("N" in step S12), the flow may proceed to step S13. In step S13, it may be determined again whether the input clutch 24 is in the release state. A situation where it is determined that "the input clutch 24 is in the release state" in step S13 may involve the hybrid electric vehicle 11 being traveling, the engine start request being made, and the input clutch 24 being in the release state. In other words, the situation where it is determined that "the input clutch 24 is in the release state" in step S13 may be a situation where it is required to switch, in the first switching pattern, the traveling mode from the motor traveling mode to the engine traveling mode. In the first switching pattern, the engine 13 may be started while the hybrid electric vehicle 11 is traveling, and the input clutch 24 may be brought into the engagement state. When the input clutch 24 is determined as being in the release state in step S13 ("Y" in step S13), the flow may proceed to step S14. In step S14, the engine 13 may be started, following which the flow may proceed to step S15. In step S15, the operation state of the input clutch 24 may be switched to the engagement state at a first engaging speed, following which the flow may proceed to step S16. The first engaging speed may be a higher speed. In step S16, the motor generator 14 may output counter torque that is controlled to be first target torque. It is to be noted that the "counter torque" of the motor generator 14 may be directed to cancel the engine torque rising upon the starting of the engine 13.

In contrast, when the input clutch 24 is determined as being in the engagement state in step S13 ("N" in step S13), the flow may proceed to step S17. In step S17, the engine 13 may be started, following which the flow may proceed to step S18. In step S18, the motor generator 14 may output the counter torque. A situation where it is determined that "the input clutch 24 is in the engagement state" in step S13 may involve the hybrid electric vehicle 11 being traveling or being stopped, the engine start request being made, and the input clutch 24 being in the engagement state. In other words, the situation where it is determined that "the input clutch 24 is in the engagement state" in step S13 may be a situation where it is required to switch, in the second switching pattern, the traveling mode from the motor traveling mode to the engine traveling mode. In the second switching pattern, the engine 13 may be started while the hybrid electric vehicle 11 is stopped and the input clutch 24 is in the engagement state. In this situation, the flow may proceed to step S17. In step S17, the engine 13 may be started, following which the flow may proceed to step S18. In step S18, the motor generator 14 may output the counter torque.

Further, a situation where it is determined that "the hybrid electric vehicle 11 is stopped while the input clutch 24 is in the release state" in step S12 may be a situation where it is required to switch, in the third switching mode, the traveling mode from the motor traveling mode to the engine traveling mode. In the third switching pattern, the engine 13 may be started while the hybrid electric vehicle 11 is stopped, and the input clutch 24 may be brought into the engagement state. When it is determined in step S12 that the hybrid electric vehicle 11 is stopped while the input clutch 24 is in the release state ("Y" in step S12), the flow may proceed to step S19. In step S19, the engine 13 may be started, following which the flow may proceed to step S20. In step S20, the operation state of the input clutch 24 may be switched to the engagement state at a second engaging speed, following which the flow may proceed to step S21. The second engaging speed may be a lower speed. In step S21, the motor generator 14 may output the counter torque that is controlled to be second target torque. It is to be noted that the second engaging speed at which the input clutch 24 is brought into the engagement state may be lower than the first engaging speed described above. Further, the second target torque of the motor generator 14 may be lower than the first target torque described above.

[Traveling Mode Switching Control (Timing Charts)]

Figure 5:
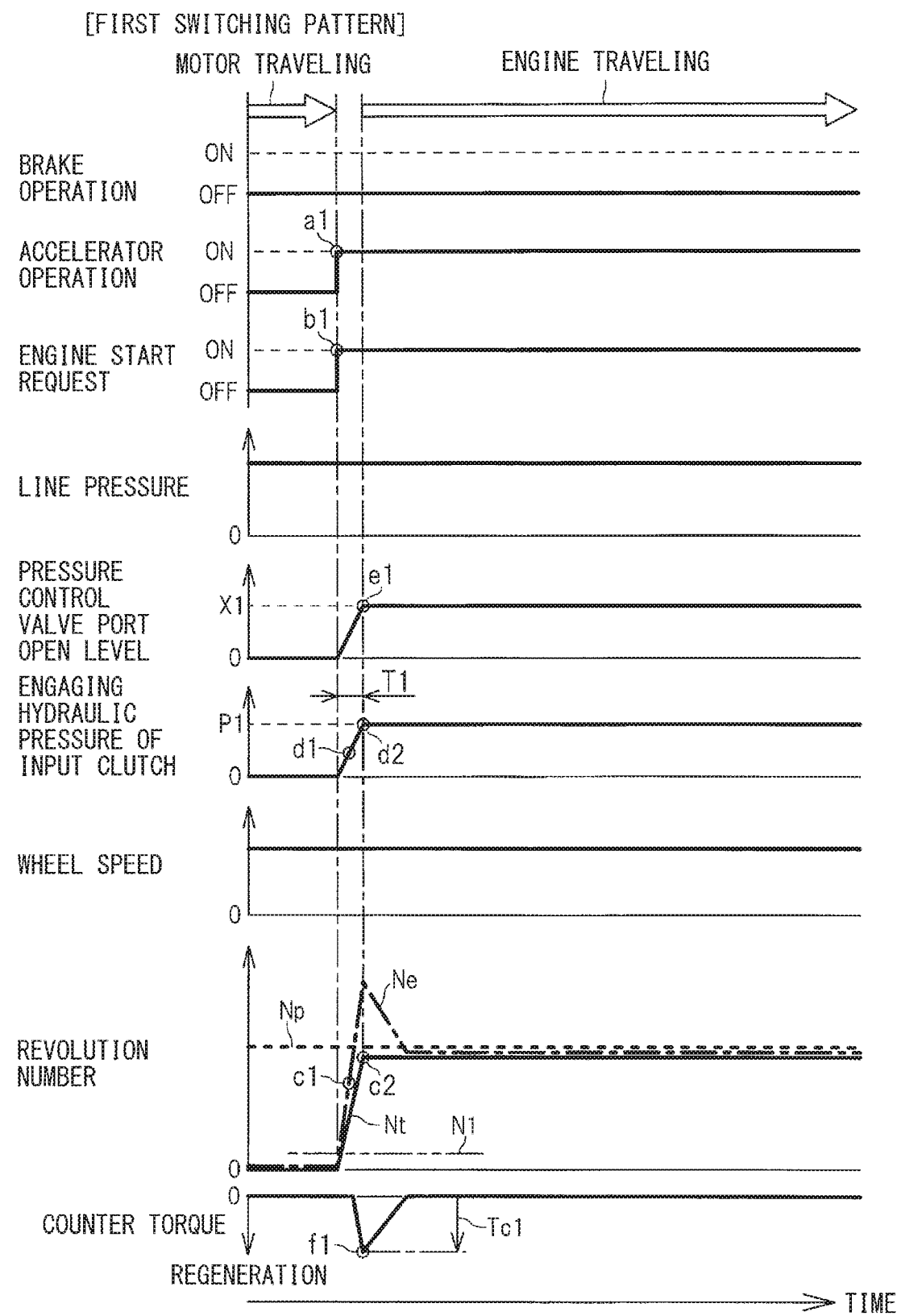
FIG. 5 is timing charts illustrating an example of a situation of executing a first switching pattern.
Figure 6:
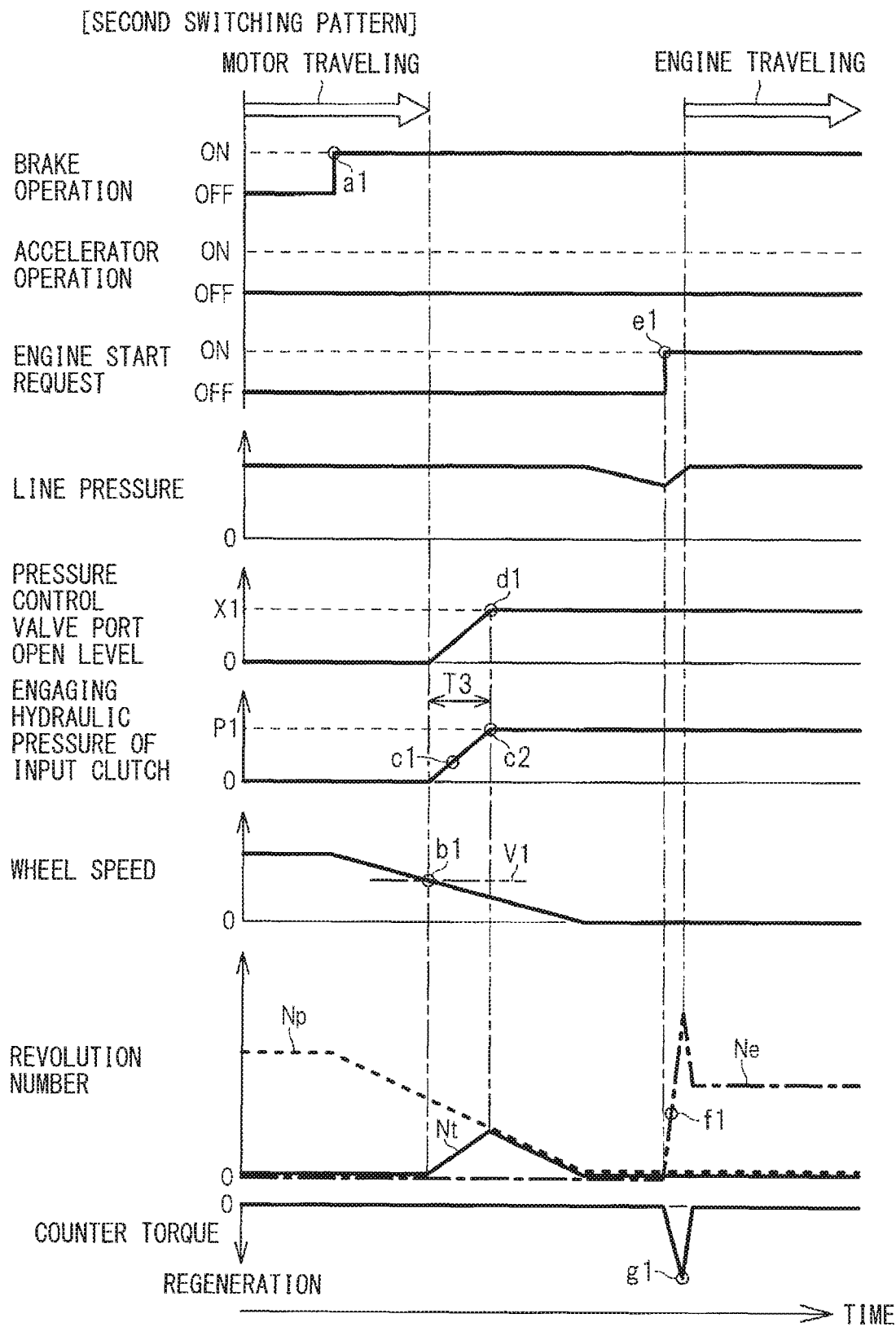
FIG. 6 is timing charts illustrating an example of a situation of executing a second switching pattern.
Figure 7:
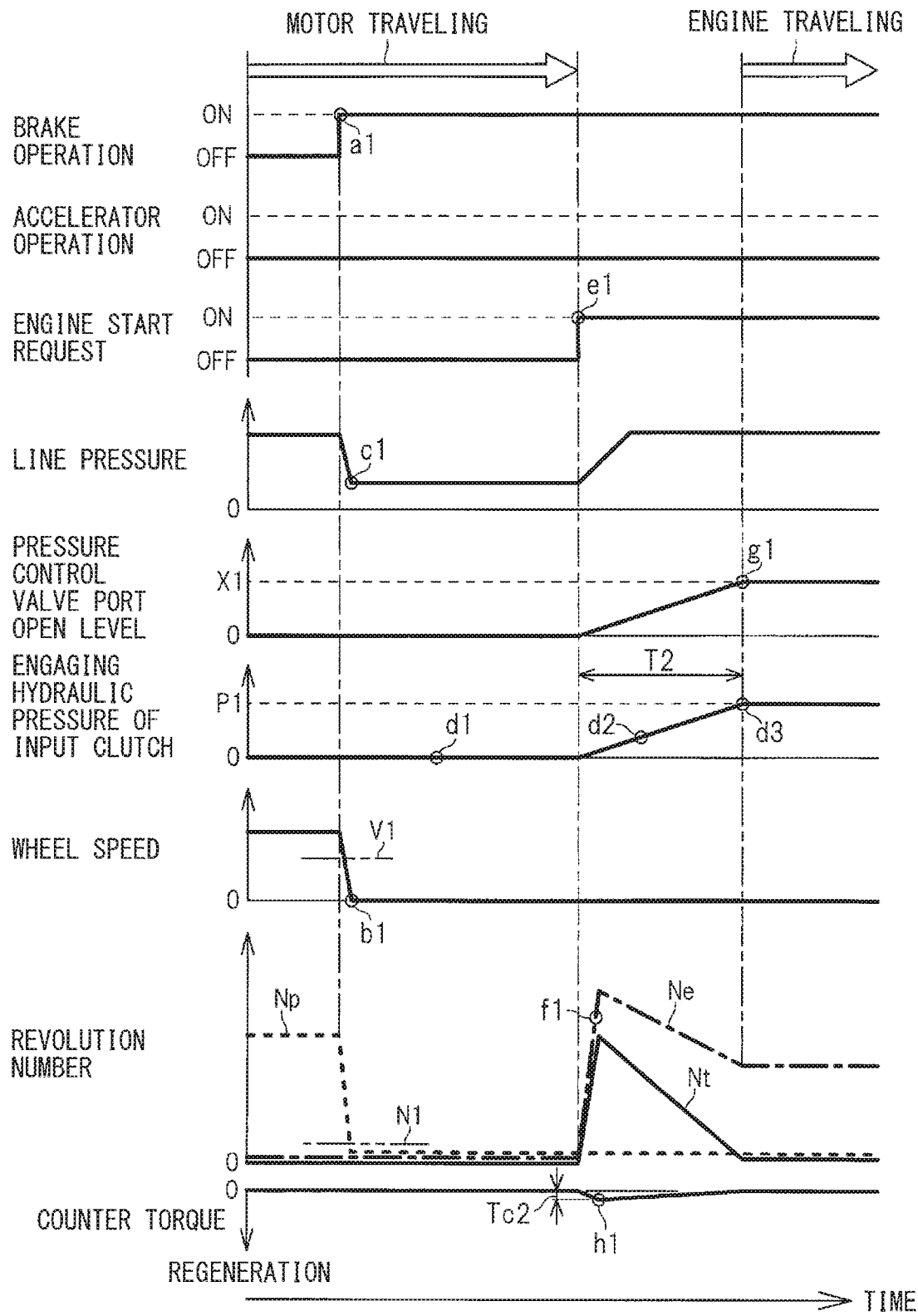
FIG. 7 is timing charts illustrating an example of a situation of executing a third switching pattern.

Referring to timing charts, a description is given below of the control of starting the engine 13, the control of engaging of the input clutch 24, and the control of torque of the motor generator 14 in each of the switching patterns. FIG. 5 is timing charts illustrating an example of a situation of executing the first switching pattern. FIG. 6 is timing charts illustrating an example of a situation of executing the second switching pattern. FIG. 7 is timing charts illustrating an example of a situation of executing the third switching pattern. In FIGS. 5 to 7, an ON state of a braking operation refers to a state where the brake pedal is pressed down, and an ON state of an accelerator operation refers to a state where the accelerator pedal is pressed down. An OFF state of the braking operation refers to a state where the brake pedal is released, i.e., not being pressed down, and an OFF state of the accelerator operation refers to a state where the accelerator pedal is released, i.e., not being pressed down. Further, an ON state of the engine start request refers to a state where the engine start request is being made, i.e., a state where the switching of the traveling mode to the engine traveling mode is required. An OFF state of the engine start request refers to a state where the engine start request is not being made, i.e., a state where the switching of the traveling mode to the engine traveling mode is not required. It is to be noted that, in FIGS. 5 to 7, an engine revolution number Ne, a primary revolution number Np, and a turbine revolution number Nt are illustrated with a slight difference even if two or all of the foregoing numbers are the same, for the sake of easier understanding of variation in each revolution number. The engine revolution number Ne refers to a revolution speed of the crankshaft 19. The primary revolution number Np refers to a revolution speed of the primary shaft 51. The turbine revolution number Nt refers to a revolution speed of the turbine shaft 41. A line pressure illustrated in FIGS. 5 to 7 refers to a basic hydraulic pressure of the hydraulic oil supplied from the oil pump to the valve unit 58.

[First Switching Pattern]

Referring to FIG. 5, when the accelerator pedal is pressed down as indicated by "a1" while the hybrid electric vehicle 11 is traveling in the motor traveling mode, the requested drive force may be increased, which may cause the engine start request to be outputted as indicated by "b1". When the engine start request is outputted, revolution to start the engine 13, i.e., cranking may be started as indicated by "c1", and the engaging hydraulic pressure of the input clutch 24 may be increased as indicated by "d1". The engaging hydraulic pressure of the input clutch 24 refers to a hydraulic pressure to be applied to the engagement oil chamber 24a of the input clutch 24. When the engaging hydraulic pressure of the input clutch 24 is to be increased up to a predetermined target hydraulic pressure P1 as indicated by "d2", a port of an unillustrated pressure control valve built in the valve unit 58 may be opened up to a predetermined target open level X1 as indicated by "e1". Further, when the input clutch 24 is to be brought into the engagement state in the first switching pattern, the operation state of the input clutch 24 may be switched to the engagement state at the first engaging speed that is higher than the second engaging speed which will be described later. In other words, when the input clutch 24 is to be brought into the engagement state in the first switching pattern, the port of the pressure control valve may be opened up to the target open level X1 in a first engaging time period T1 that is shorter than a second engaging time period T2 which will be described later.

Figure 8:
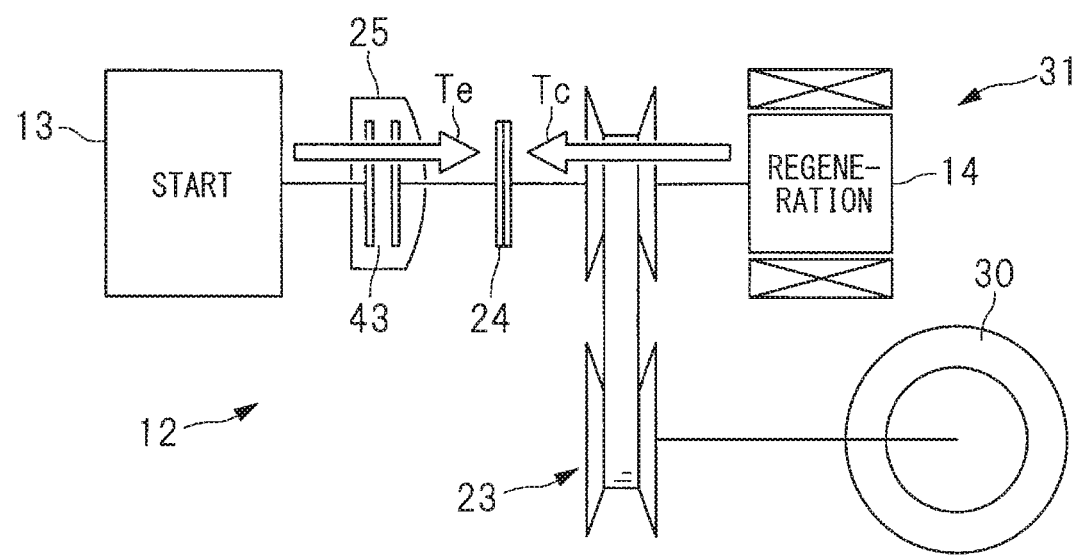
FIG. 8 is a diagram illustrating an outline of an example of a situation of outputting counter torque.

In accordance with the starting of the engine 13 and the switching of the operation state of the input clutch 24 to the engagement state, the engine torque upon the starting of the engine 13 may be transmitted to the motor driving system 31. Therefore, upon the starting of the engine 13, the regenerative counter torque controlled to be the first target torque Tc1 may be outputted from the motor generator 14 as indicated by "f1". In one implementation, the regenerative counter torque may correspond to "torque". FIG. 8 illustrates an outline of a situation of outputting the counter torque. As illustrated in FIG. 8, the outputting of counter torque Tc that is the regenerative torque from the motor generator 14 may allow for cancelling of the engine torque Te inputted from the engine 13 to the motor driving system 31. This suppresses generation of vibrations attributed to the variation in torque. It is to be noted that the magnitude of the counter torque outputted from the motor generator 14 may be adjusted on the basis of an amount of torque capacity of the input clutch 24 that increases during the engaging of the input clutch 24. For example, the magnitude of the counter torque outputted from the motor generator 14 may be adjusted on the basis of a factor such as an engaging speed of the input clutch 24 or a temperature of the hydraulic oil.

As described above, in the first switching pattern that switches the traveling mode from the motor traveling mode to the engine traveling mode during the traveling of the hybrid electric vehicle 11, the input clutch 24 may be brought into the engagement state swiftly at the first engaging speed. This brings the input clutch 24 into the engagement state before the turbine revolution number Nt in accordance with the engine revolution number Ne rises greatly. This suppresses an increase in the turbine revolution number Nt attributed to the starting of the engine 13 as indicated by "c2" in FIG. 5, which suppresses engagement shock at the input clutch 24. Because a component such as the turbine runner 42 of the torque converter 25 has greater inertia, the increase in the turbine revolution number Nt may cause an increase in engagement shock at the input clutch 24. However, suppressing the increase in the turbine revolution number Nt by swiftly bringing the input clutch 24 into the engagement state suppresses the engagement shock at the input clutch 24 attributed to the switching of the traveling mode.

[Second Switching Pattern]

Referring to FIG. 6, when the brake pedal is pressed down as indicated by "a1" while the hybrid electric vehicle 11 is traveling in the motor traveling mode, and the wheel speed, i.e., the vehicle speed is decreased down to a predetermined vehicle speed V1 as indicated by "b1", the engaging hydraulic pressure of the input clutch 24 may be increased as indicated by "c1". The predetermined vehicle speed V1 may be, for example but not limited to, 8 km/h. When the engaging hydraulic pressure of the input clutch 24 is to be increased up to the predetermined target hydraulic pressure P1 as indicated by "c2", the port of the unillustrated pressure control valve built in the valve unit 58 may be opened up to the predetermined target open level X1 as indicated by "d1". Further, when the input clutch 24 is to be brought into the engagement state in the second switching pattern, the operation state of the input clutch 24 may be switched to the engagement state at a third engaging speed. In other words, when the input clutch 24 is to be brought into the engagement state in the second switching pattern, the port of the pressure control valve may be opened up to the target open level X1 in a third engaging time period T3. It is to be noted that the third engaging speed may be lower than the first engaging speed and higher than the second engaging speed which will be described later. That is, the third engaging time period T3 may be longer than the first engaging time period T1 and shorter than the second engaging time period T2 described later.

Thereafter, when the engine start request is outputted as indicated by "e1" while the vehicle is stopped as a result of bringing a device such as the air conditioning unit 67 into the operating state, the cranking of the engine 13 may be started as indicated by "f1" and the counter torque may be outputted from the motor generator 14 as indicated by "g1". Accordingly, also in a case where the traveling mode is switched to the engine traveling mode while the vehicle is stopped, the variation in torque upon the starting of the engine 13 is suppressed. This suppresses generation of vibrations attributed to the variation in torque. It is to be noted that the magnitude of the counter torque outputted from the motor generator 14 may be adjusted on the basis of the engine torque that rises upon the starting of the engine 13.

[Third Switching Pattern]

Referring to FIG. 7, when the brake pedal is pressed down as indicated by "a1" while the hybrid electric vehicle 11 travels in the motor traveling mode on, for example but not limited to, a road surface covered with ice and the wheels 30 are locked to cause a sharp decrease in wheel speed as indicated by "b1", the line pressure may be sharply decreased as indicated by "c1" in accordance with a decrease in pressure of the mechanical oil pump 55. In this case, it may be more difficult to bring the input clutch 24 into the engagement state before the hybrid electric vehicle 11 is stopped. Therefore, the hybrid electric vehicle 11 may be stopped without bringing the input clutch 24 into the engagement state as indicated by "d1".

Thereafter, when the engine start request is outputted as indicated by "e1" while the hybrid electric vehicle 11 is stopped as a result of bringing a device such as the air conditioning unit 67 into the operating state, the cranking of the engine 13 may be started as indicated by "f1" and the engaging hydraulic pressure of the input clutch 24 may be increased as indicated by "d2". When the engaging hydraulic pressure of the input clutch 24 is to be increased up to the predetermined target hydraulic pressure P1 as indicated by "d3", the port of the unillustrated pressure control valve built in the valve unit 58 may be opened up to the predetermined target open level X1 as indicated by "g1". Further, when the input clutch 24 is to be brought into the engagement state in the third switching pattern, the operation state of the input clutch 24 may be switched to the engagement state at the second engaging speed that is lower than the first engaging speed described above. In other words, when the input clutch 24 is to be brought into the engagement state in the third switching pattern, the port of the pressure control valve may be opened up to the target open level X1 in the second engaging time period T2 that is longer than the first engaging time period T1 described above.

As described above, in the third switching pattern that stops the hybrid electric vehicle 11 traveling in the motor traveling mode without bringing the input clutch 24 into the engagement state, and brings the input clutch 24 into the engagement state while starting the engine 13 after the stopping of the hybrid electric vehicle 11, the input clutch 24 may be brought into the engagement state more slowly at the second engaging speed. This allows for a moderate increase in torque capacity of the input clutch 24, which avoids abrupt transmission of the engine torque to the motor driving system 31. In other words, the variation in torque of the motor driving system 31 is suppressed, which suppresses generation of vibrations attributed to the variation in torque.

Further, upon the starting of the engine 13, the counter torque that is controlled to be the second target torque Tc2 lower than the first target torque Tc1 may be outputted from the motor generator 14 as indicated by "h1". That is, suppressing of the variation in torque of the motor driving system 31 as a result of the slower engagement of the input clutch 24 suppresses the counter torque of the motor generator 14 to be lower. It is to be noted that the counter torque of the motor generator 14 may be controlled to be substantially zero if the variation in torque is allowed to be suppressed sufficiently by controlling the engaging of the input clutch 24.

[Summary of First Switching Pattern and Third Switching Pattern]

Referring to FIG. 5, the engine 13 may be started in the first switching pattern in a situation where the primary revolution number Np which is the revolution speed of the motor driving system 31 is greater than the predetermined revolution threshold N1. In a case where the engine 13 is thus started on the condition that the primary revolution number Np is greater than the predetermined revolution threshold N1, the input clutch 24 may be controlled to be brought into the engagement state at the first engaging speed. That is, referring to FIG. 5, the situation where the primary revolution number Np is greater than the revolution threshold N1 may be a situation where a part on the output side of the input clutch 24 revolves and where the starting of the engine 13 reduces a difference in revolution speed between a part on the input side of the input clutch 24 and the part on the output side of the input clutch 24. In this case, the engaging of the input clutch 24 may make it more difficult for the torque of the motor driving system 31 to vary sharply. Therefore, the traveling mode may be switched swiftly from the motor traveling mode to the engine traveling mode by swiftly bringing the input clutch 24 into the engagement state at the first engaging speed.

In contrast, referring to FIG. 7, the engine 13 may be started in the third switching pattern in a situation where the primary revolution number Np which is the revolution speed of the motor driving system 31 is smaller than the predetermined revolution threshold N1. In a case where the engine 13 is thus started on the condition that the primary revolution number Np is smaller than the predetermined revolution threshold N1, the input clutch 24 may be controlled to be brought into the engagement state at the second engaging speed that is lower than the first engaging speed. That is, referring to FIG. 7, the situation where the primary revolution number Np is smaller than the revolution threshold N1 may be a situation where the part on the output side of the input clutch 24 is almost stopped and where the starting of the engine 13 increases the difference in revolution speed between the part on the input side of the input clutch 24 and the part on the output side of the input clutch 24. In this case, the engaging of the input clutch 24 may make it easier for the torque of the motor driving system 31 to vary sharply. Therefore, the variation in torque of the motor driving system 31 may be suppressed by bringing the input clutch 24 into the engagement state more slowly at the second engaging speed. This suppresses vibrations at the time of the switching of the traveling mode.

Moreover, referring to FIG. 7, in the case where the input clutch 24 is brought into the engagement state more slowly, the variation in torque of the motor driving system 31 may be suppressed. This suppresses the counter torque of the motor generator 14 or control the counter torque of the motor generator 14 to be substantially zero. Thus reducing the counter torque of the motor generator 14 suppresses variation in torque as a result of the counter torque. Therefore, the vibrations at the time of the switching of the traveling mode is also suppressed from this point of view. Moreover, the switching of the traveling mode as a result of bringing a device such as the air conditioning unit 67 into the operating state may be unintended by an occupant of the hybrid electric vehicle 11. Therefore, the generation of vibrations accompanying the switching of the traveling mode can be a factor that greatly gives the occupant of the hybrid electric vehicle 11 a feeling of strangeness; however, it is possible to avoid such generation of vibrations.

In the examples illustrated in FIGS. 5 and 7, the revolution threshold N1 that is a reference of comparison with the primary revolution number Np is set around 0 (zero) [rpm]. That is, in a case where the primary revolution number Np is greater than the revolution threshold N1 and the motor driving system 31 is determined as revolving, the input clutch 24 may be brought into the engagement state at the first engaging speed and the counter torque may be controlled to be the first target torque Tc1. In contrast, in a case where the primary revolution number Np is smaller than the revolution threshold N1 and the motor driving system 31 is determined as being almost stopped, the input clutch 24 may be brought into the engagement state at the second engaging speed and the counter torque may be controlled to be the second target torque Tc2. However, the examples illustrated in FIGS. 5 and 7 are non-limiting and the revolution threshold N1 may be set to any value. For example, the revolution threshold N1 may be set to a value smaller than those set in the examples illustrated in FIGS. 5 and 7, and may be set to a value greater than those set in the examples illustrated in FIGS. 5 and 7.

For example, on a condition that the revolution threshold N1 is set to a value smaller than those set in the examples illustrated in FIGS. 5 and 7, the input clutch 24 may be brought into the engagement state at the first engaging speed and the counter torque may be controlled to be the first target torque Tc1, in a case where the primary revolution number Np is greater than the revolution threshold N1 and the motor driving system 31 is determined as revolving. In contrast, the input clutch 24 may be brought into the engagement state at the second engaging speed and the counter torque may be controlled to be the second target torque Tc2, in a case where the primary revolution number Np is smaller than the revolution threshold N1 and the motor driving system 31 is determined as being almost stopped on the foregoing condition.

Further, for example, on a condition that the revolution threshold N1 is set to a value greater than those set in the examples illustrated in FIGS. 5 and 7, the input clutch 24 may be brought into the engagement state at the first engaging speed and the counter torque may be controlled to be the first target torque Tc1, in a case where the primary revolution number Np is greater than the revolution threshold N1 and the motor driving system 31 is determined as revolving at a higher speed. In contrast, the input clutch 24 may be brought into the engagement state at the second engaging speed and the counter torque may be controlled to be the second target torque Tc2, in a case where the primary revolution number Np is smaller than the revolution threshold N1 and the motor driving system 31 is determined as revolving at a lower speed.

It is to be noted that, in the above-described examples, the primary revolution number Np may be set as the revolution speed of the motor driving system 31; however, the primary revolution number Np is not limited thererto and may be a revolution speed of any component of the motor driving system 31. For example, the engaging speed of the input clutch 24, the target torque of the counter torque, etc. at the time of switching of the traveling mode may be varied on the basis of a revolution speed such as the revolution speed of the motor generator 14, the revolution speed of the secondary shaft 52, or the revolution speed of the wheel 30.

Although some implementations of the technology have been described in the foregoing by way of example with reference to the accompanying drawings, the technology is by no means limited to the example implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the hybrid electric vehicle 11 to which the vehicle control apparatus 10 according to an example implementation of the technology is applied is not limited to the hybrid electric vehicle 11 having the configuration illustrated in the accompanying drawings, and may have any configuration as long as the hybrid electric vehicle 11 includes the engine 13 and the traveling motor. Moreover, for example, the input clutch 24 may include a hydraulic clutch in the example implementation described above; however, this is non-limiting. In another example implementation, the input clutch 24 may include an electromagnetic clutch. Moreover, for example, the torque converter 25 may be provided between the engine 13 and the input clutch 24 in the example configuration in the accompanying drawing; however, this is non-limiting. In another example implementation, the torque converter 25 may not be provided between the engine 13 and the input clutch 24.

According to one implementation of the technology, a clutch mechanism may be controlled to be brought into an engagement state at a second engaging speed that is lower than a first engaging speed in a case where an engine is started on a condition that a revolution speed of a motor driving system is lower than a revolution threshold. As a result, it is possible to suppress vibrations at the time of switching of a traveling mode from a motor traveling mode to an engine traveling mode.

Each of the engine controller 60, the transmission controller 61, the motor controller 62, the battery controller 63, the air conditioning controller 64, the main controller 65, the engine traveling mode controller 80, and the traveling mode switching unit 82 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the engine controller 60, the transmission controller 61, the motor controller 62, the battery controller 63, the air conditioning controller 64, the main controller 65, the engine traveling mode controller 80, and the traveling mode switching unit 82 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the engine controller 60, the transmission controller 61, the motor controller 62, the battery controller 63, the air conditioning controller 64, the main controller 65, the engine traveling mode controller 80, and the traveling mode switching unit 82 illustrated in FIG. 2.

The invention claimed is:

1. A vehicle control apparatus comprising:
 a motor driving system including a traveling motor and a wheel coupled to the traveling motor;
 a clutch mechanism provided between an engine and the motor driving system, the clutch mechanism having an operation state that is switchable between an engagement state and a release state;
 a clutch controller configured to switch the operation state of the clutch mechanism from the release state to the engagement state;
 an engine controller configured to start the engine upon the switching of a traveling mode from a motor traveling mode to an engine traveling mode, the motor traveling mode allowing for traveling based on the traveling motor, the engine traveling mode allowing for traveling based on the engine;
 a motor controller configured to control the traveling motor to output a counter torque at a time of the starting of the engine upon the switching of the traveling mode from the motor traveling mode to the engine traveling mode; and
 a hydraulic system configured to control supply of a hydraulic oil to the clutch mechanism, the hydraulic system comprising a mechanical oil pump configured to be driven by the engine or the traveling motor, wherein when the engine is started on a condition that 1) the clutch mechanism is in the release state and 2) a revolution speed of the motor driving system is higher than a revolution threshold, the clutch controller switches the operation state of the clutch mechanism from the release state to the engagement state at a first engaging speed and the motor controller controls the traveling motor to output a first counter torque, and wherein, when the engine is started on a condition that 1) the clutch mechanism is in the release state, 2) the revolution speed of the motor driving system is lower than the revolution threshold, and 3) a line pressure of the hydraulic system is lower than a first pressure for engaging the clutch mechanism, the clutch controller switches the operation state of the clutch mechanism from the release state to the engagement state at a second engaging speed and the motor controller controls the traveling motor to output a second counter torque such that a period of time for switching the operation state of the clutch mechanism from the release state to the engagement state at the second engaging speed is longer than a period of time for recovering the line pressure of the hydraulic system above the first pressure.

2. The vehicle control apparatus according to claim 1, wherein the condition that the revolution speed of the motor driving system is higher than the revolution threshold comprises a condition that the motor driving system revolves, and the condition that the revolution speed of the motor driving system is lower than the revolution threshold comprises a condition that the motor driving system is stopped.

3. The vehicle control apparatus according to claim 2, further comprising a torque converter provided between the engine and the clutch mechanism.

4. The vehicle control apparatus according to claim 1, further comprising a torque converter provided between the engine and the clutch mechanism.

5. A vehicle control apparatus comprising:

a motor driving system including a traveling motor and a wheel coupled to the traveling motor;

a clutch mechanism provided between an engine and the motor driving system and has an operation state that is switchable between an engagement state and a release state;

a hydraulic system configured to control supply of a hydraulic oil to the clutch mechanism, the hydraulic system comprising a mechanical oil pump configured to be driven by the engine or the traveling motor; and circuitry configured to:

switch the operation state of the clutch mechanism from the release state to the engagement state;

start the engine upon the switching of a traveling mode from a motor traveling mode to an engine traveling mode, the motor traveling mode allowing for traveling based on the traveling motor, the engine traveling mode allowing for traveling based on the engine; and control the traveling motor to output a counter torque at a time of the starting of the engine upon the switching of the traveling mode from the motor traveling mode to the engine traveling mode, wherein, when the engine is started on a condition that 1) the clutch mechanism is in the release state and 2) a revolution speed of the motor driving system is higher than a revolution threshold, the circuitry is configured to switch the operation state of the clutch mechanism from the release state to the engagement state at a first engaging speed and controls the torque of the traveling motor to output a first counter torque, and wherein, when the engine is started on a condition that 1) the clutch mechanism is in the release state, 2) the revolution speed of the motor driving system is lower than the revolution threshold, and 3) a line pressure of the hydraulic system is lower than a first pressure for engaging the clutch mechanism, the circuitry switches the operation state of the clutch mechanism from the release state to the engagement state at a second engaging speed and controls the traveling motor to output a second counter torque such that a period of time for switching the operation state of the clutch mechanism from the release state to the engagement state at the second engaging speed is longer than a period of time for recovering the line pressure of the hydraulic system above the first pressure.

* * * * *